United States Patent [19]

MacFarlane et al.

[11] Patent Number: 6,125,354

[45] Date of Patent: Sep. 26, 2000

[54] SYSTEM AND METHOD FOR GENERATING AN INVOICE TO REBILL CHARGES TO THE ELEMENTS OF AN ORGANIZATION

[75] Inventors: Lloyd MacFarlane, Mahopac, N.Y.; Dwight D. Driskell, Birmingham, Ala.; Vivian C. Henley, Jackson, Miss.; Nancy C. Lane, Birmingham, Ala.; Michael Greenspan, New York, N.Y.; Betty J. Nielsen, St. Amant, La.

[73] Assignee: BellSouth Intellectual Property Corporation, Wilmington, Del.

[21] Appl. No.: 09/050,721

[22] Filed: Mar. 30, 1998

Related U.S. Application Data

[60] Provisional application No. 60/042,211, Mar. 31, 1997.

[51] Int. Cl.$^7$ ........................................................ G06F 17/60
[52] U.S. Cl. ................................ 705/34; 705/29; 705/30; 705/40
[58] Field of Search ................................ 705/34, 32, 30, 705/29, 33, 40, 20; 455/406

[56] References Cited

U.S. PATENT DOCUMENTS

| | | | |
|---|---|---|---|
| 5,325,290 | 6/1994 | Cauffman et al. | 705/34 |
| 5,483,445 | 1/1996 | Pickering | 705/40 |
| 5,684,965 | 11/1997 | Pickering | 705/34 |
| 5,696,906 | 12/1997 | Peters et al. | 705/34 |
| 5,852,812 | 12/1998 | Reeder | 705/34 |
| 5,878,400 | 3/1999 | Carter, III | 705/20 |

FOREIGN PATENT DOCUMENTS

| | | | |
|---|---|---|---|
| WO 96/32806 | 10/1996 | WIPO | H04M 15/00 |
| WO 9632806 | 10/1996 | WIPO . | |
| WO 97/31320 | 8/1997 | WIPO | G06F 17/60 |
| WO 9731320 | 8/1997 | WIPO . | |
| WO 98/00804 | 1/1998 | WIPO . | |
| WO 9800804 | 1/1998 | WIPO . | |

OTHER PUBLICATIONS

Ricci, Claudia, "Personal Use of Company Phones is Target of Cost–Cutting Efforts", The Wall Street Journal, Apr. 1984.

Tribase Systems, Inc., "Easy–To–Use Telephone Call Accounting Software for PCs is Also Easy on Small Company Budgets", Dialog File 621:New Product Announcement, Sep. 1990.

Stusser, Daniel I., "What's New in Call Accounting? Call Accounting Remains an Active Market", Business Communications Review, v21, n8, p41(5), Aug. 1991.

Finnie, Graham, "Cracking The Complex Cost Puzzle", Communications Week International, p. 24, Sep. 1994.

Osborne, Joan, "Integrating Support Systems Brings Telcos Closer to Customers", Communications Week International, n133, p. 43, Oct. 1994.

Langner, Mark; Voik, Jacqueline, "How To Make a Billing" 1994.

BellSouth Diskette Analyzer Bill User's Guide, p. 53, Jul. 1994.

Bauer, Matthew, "International Virtual Private Networks: Background and Tariff Survey", International Journal of Network Management, vol. 5, No. 2, pp. 95–99, Mar. 1995.

(List continued on next page.)

*Primary Examiner*—Emanuel Todd Voeltz
*Assistant Examiner*—John W. Hayes
*Attorney, Agent, or Firm*—Jones & Askew, LLP

[57] ABSTRACT

A method and system for automatically adjusting charges billed to an organization by a service provider, so as to create an invoice of rebill charges. An organizational hierarchy, comprising a list of elements of an organization, is displayed on a display device. Services that have been provided to a selected element by one or more service providers are associated with the selected element. The billed charges for the services are then adjusted, so as to calculate the rebill charges.

Adjustment of the billed charges is effected by applying reprice parameters and miscellaneous charges. The reprice parameters are used to adjust the billed charge by a desired percentage, by a fixed rate per time, or by a fixed charge per service. The miscellaneous charges are in addition to the billed charges. After adjustment of the billed charges, an invoice is generated based on the rebill charge.

13 Claims, 4 Drawing Sheets

OTHER PUBLICATIONS

Gates, Nancy, "Using Call Accounting Software as a Management Tool", Telemarketing & Call Center Solutions, v14, n12, pp 62–66, Jun. 1996.

Thurlings, L, "The Landscape of Innovation and Supply: A Graphical Model for Visualising the Interrelationships Between the Innovation Functions and the Supply Chain", ISBN 0–7803–3552–X, New York, NY, IEEE, 1996.

Wilamowski, Jay, "Enhanced Centrex Improves Internal Billing", Communications News, v33, n6, p. 14, Jun. 1996.

BellSouth Diskette Analyzer Bill User's Guide; p. 53.

Thurling L: "The landscape of innovation and supply: a graphical model for visualising the interrelationship between the innovation functions and the supply chain" ISBN 0–7803–3552–X, 1996, New York, NY, USA, IEEE, USA.

Bauer, M:"International Virtual Private Networks: Background and Tariff Survey" International Journal of Network Management, vol. 5, No. 2, Mar. 1995, pp. 95–99, XP000609580.

Price Adjustment Parameters

Use the fields below to specify the manner in which the cost of each call must be adjusted. You may mark the cost of a call Up/down by a percentage or by a Dollar Amount Per Minute or a Dollar Amount Per Call.

| | | | |
|---|---|---|---|
| Local | Adjust The Cost Of Each Call By | 10% | |
| Intrastate | Reprice each call at | 0.30 | /Call |
| Interstate | Adjust The Cost Of Each Call By | 15% | |
| Int'l | Adjust The Cost Of Each Call By | 0.25 | /Min |
| Dir Asst | Reprice each call at | 0.70 | /Call |

Monthly | OC&C | Usage

[Save] [Close]

FIG. 4

Enter Miscellaneous Charges

Apr 1996

| User Code | Description | Amount |
|---|---|---|
| M10090 | Upgrading A/C in the telephone Room | $12,500.00 |

[Close]

SYSTEM AND METHOD FOR GENERATING AN INVOICE TO REBILL CHARGES TO THE ELEMENTS OF AN ORGANIZATION

RELATED APPLICATIONS

Filing priority is claimed to U.S. Provisional Application Ser. No. 60/042,211, filed on Mar. 31, 1997.

Also, U.S. patent application Ser. No. 09/050,333 by Driskell et al. (attorney docket no. 19260-1100), which is being filed concurrently with this patent application and is entitled "A System and Method for Associating Services Information with Selected Elements of an Organization," is hereby incorporated by reference.

TECHNICAL FIELD

The present invention generally relates to generating an invoice of charges related to the association of services with elements of an organization. More particularly, the present invention relates to the automated generation of an invoice of charges related to the association of telecommunications services with a selected element of an organization. Even more particularly, the present invention relates to the automated generation of an invoice for the purpose of rebilling charges to selected elements that comprise an organization.

BACKGROUND OF THE INVENTION

Typically, an organization is structured as a collection of individual elements. For example, in the corporate context, a business organization may be an aggregation of branches, divisions, regional offices, etc. However, the structure of an organization is often transparent to the outside commercial world. Thus, since each element independently incurs costs and liabilities, an organization must adopt a system for generating internal invoices to distribute such costs and liabilities to the individual elements.

In particular, service providers often bill an organization, as a whole, for services that are provided individually to various elements that comprise the organization. Subsequently, the organization must determine what portions of the billed charges are to be allocated to each element. The organization may also wish to adjust the charges allocated to an element by marking up/down the charges or including additional service fees, etc. After all allocations and adjustments are made, the organization must generate an internal invoice for each element.

In the past, the process of allocating, adjusting, and billing charges to the elements of an organization was a daunting task for any large organization to undertake. Traditionally, the process has been performed manually, which caused it to be labor intensive and extremely inefficient. The larger the organization, the more elements it is likely to contain. Thus, the larger the organization, the more time consuming and costly the process of generating internal invoices becomes.

The problem of generating an internal invoice for each element of a large organization is compounded by the fact that each element is likely to incur differing amounts of charges for a wide variety of products and services. The organization may wish to adjust the charges for each product and each service in a different manner, for example by a percentage or by a fixed amount. Further, the organization may wish to adjust the charges at a different rate or percentage for each element of the organization. Also, the organization may wish to charge varying amounts of miscellaneous fees to each of its elements.

Therefore, there remains a need for an automated system that allows an organization to generate an invoice for at least a portion of the billed charges incurred by the organization during a given period of time, and to distribute this invoice to an element of the organization.

Also, there remains a need for a system that allows an organization to automatically allocate billed charges to the elements of the organization and to adjust the allocated charges on a charge by charge and element by element basis.

SUMMARY OF THE PRESENT INVENTION

In accordance with the present invention, a method and system are provided for automatically adjusting charges billed to an organization by a service provider, so as to create a rebill charge. The method and system include a display of an organizational hierarchy on a display device, the organizational hierarchy including at least one element of the organization. The method and system associate a selected element with a service that has been provided to the selected element by the service provider. The billed charge for the service is then adjusted, so as to calculate the rebill charge.

To adjust the billed charge, the method and system may accept a reprice parameter and/or a miscellaneous charge. The reprice parameter is used to adjust the billed charge by a desired percentage, by a fixed rate per time, or by a fixed charge per service. The miscellaneous charge is a charge that is in addition to the billed charge. After the billed charge is adjusted, an invoice is generated based on the rebill charge. With the method and system of the present invention, the billed charge can be automatically adjusted and rebilled to any element in the organizational hierarchy.

Additional features of the present invention allow the rebilling of charges to be done on more detailed levels. For example, the system and method may include features that allow the services associated with the selected element of the organization to be restricted by date, or by service vendor or provider.

The method and system of the present invention may be used as a component of an integrated electronic billing analysis and management system. As such, a useful feature of the present invention is that the method may be encoded, in the form of computer executable instructions, on a computer-readable medium.

According to one aspect of the present invention, the user interface is presented as an "invoice specification" screen having thereon a field containing an organizational hierarchy and a field containing a list of service providers which have billed charges to the organization. The invoice specification screen preferably contains at least one reprice parameter input field for accepting reprice parameters used to calculating rebill charges. The invoice specification screen also preferably includes at least one miscellaneous charges input field for accepting miscellaneous charges used to calculate the rebill charges. In one embodiment, the invoice specification screen includes a selectable graphic to effect application of the reprice parameters and the miscellaneous charges to the billed charges from the service providers. Also, a selectable graphic is preferably included to effect generation of an invoice based on the billed charges and the rebilled charges.

Therefore, an important advantage of the present invention is that it allows an organization to generate an invoice for at least a portion of the billed charges incurred by the organization during a given period of time, and to distribute this invoice to an element of the organization.

Another important advantage of the present invention is that it allows an organization to automatically allocate billed charges to the elements of the organization and to adjust the allocated charges on a charge by charge and element by element basis.

DETAILED DESCRIPTION

The present invention contemplates a method and system for rebilling charges to individual elements of an organization. For example, when a service provider presents a business organization with a single bill for services, the present invention enables the organization to automatically allocate and distribute the charges to the appropriate elements, i.e. divisions, branches, departments, etc. Further, the present invention allows the organization to adjust the billed charges and to add miscellaneous charges to the bills before rebilling the charges to the various elements that comprise the organization.

The present invention is particularly advantageous to large business organizations that are presented with electronic bills from service providers in the telecommunications industry. The format of these electronic bills often varies from provider to provider. Further, each service provider typically provides a wide variety of services, which are used in different amounts by each element of the organization. Thus, the organization's difficult task of allocating billed charges to the appropriate element may be simplified by the present invention.

However, any specific references to the telecommunications industry made in the following description of the present invention are purely exemplary and in no way limit the invention to applications in the telecommunications industry. Those skilled in the art will understand that the present invention may be employed by any organization that is made up of elements and has a need to allocate and rebill charges to those elements.

In accordance with one embodiment of the present invention, the elements of the organization are displayed in a hierarchical fashion. This arrangement is particularly advantageous when elements comprising an organization are made up of subelements, which are in turn made up of smaller subelements. For example, a business organization may be divided into regional branches, which are subdivided into local branches, which are further subdivided into offices, which are still further subdivided into departments. This hierarchical arrangement, referred to hereinafter as an "organizational hierarchy," provides the organization with the ability to select a particular element or level of the organizational hierarchy and thus to calculate the rebill charges on a global or local scale relative to the organizational structure.

Figure 1:
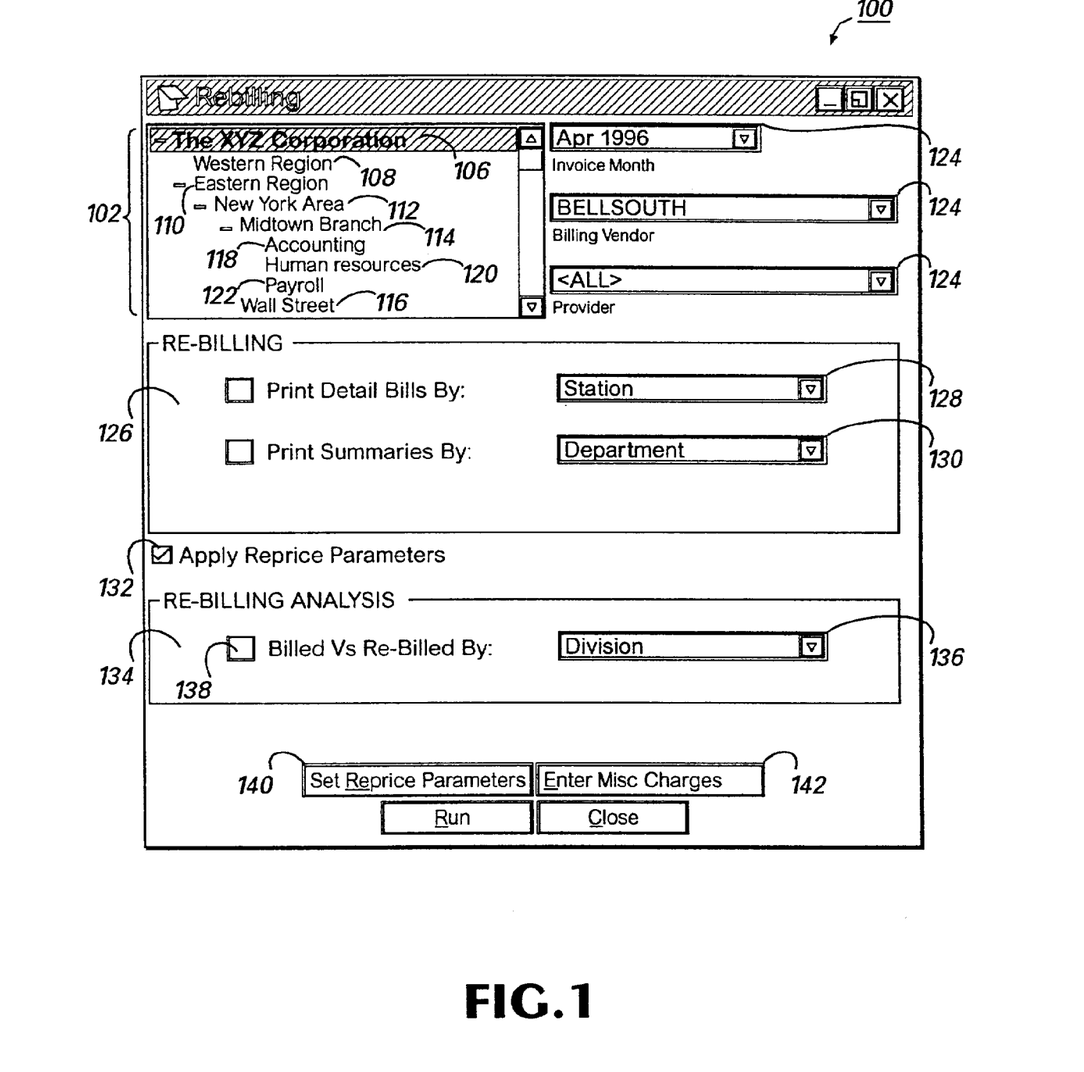
FIG. 1 is a diagram showing an exemplary rebilling screen display in accordance with the present invention.

FIG. 1 is a diagram of an exemplary Rebilling screen display 100. Shown on this screen display is an organizational hierarchy 102, which is made up of various elements of an organization. Specifically, the highest-level element is shown to be the parent XYZ corporation 106. The parent corporation is divided into the elements including the Western Region 108 and the Eastern Region 110. As shown, the Eastern region includes the New York Area 112, which in turn includes the MidTown Branch 114 and the Wall Street Branch 116. Further, the MidTown branch 114 is shown to include the Accounting department 118, the Human Resources department 120 and the Payroll department 122.

The user of the present invention may perform the rebilling procedure on any element in the organizational hierarchy 102. The customer indicates the selection of an element or hierarchical level by activating the appropriate element or level or by otherwise providing an input signal representing the selection. Typically, the system and method of the present invention is used in conjunction with a billing database. Thus, in response to the input signal representing the selected element, a catalog of billing information may be compiled for the selected element by extracting from the database each billed charge for each service provided to the selected element. In FIG. 1, the XYZ Corporation 106 has been highlighted to demonstrate one method of indicating a selected element.

Still referring to the exemplary Rebilling screen display 100 of FIG. 1, the upper right hand portion of the display includes input fields 124 for the acceptance of limiting parameters. Limiting parameters can be used to restrict the rebilling procedure by adding more constants to the equation. As an illustration, in the exemplary Rebilling screen display 100 of FIG. 1, input fields 124 are provided for the limiting parameters of "invoice month," "billing vendor," and "service provider." When these limiting parameters are accepted by the system, the rebilling procedure can be restricted to charges incurred during a particular invoice month, and/or to services of a particular billing vendor, and/or to services of a particular service provider.

Each of the input fields 124 may provide a pull-down table (referred to interchangeably as a pull-down menu, drop-down table or drop-down menu). The use of pull-down tables eliminates the need for typing and also reduces the need for error checking, since all limiting parameters provided in the pull-down table are predetermined.

Continuing to refer to FIG. 1, the exemplary Rebilling screen display 100 includes a Rebilling block 126 including input fields 128 and 130 relating to the printing of billing information. As illustrated, the Rebilling block 126 includes an input field 128 for specifying the level of the organizational hierarchy by which detailed bills are to be printed. The Rebilling block 126 also includes an input field 130 for specifying the level of the organizational hierarchy by which summaries are to be printed. As shown input fields 128 and 130 may also comprise pull-down tables.

In addition, the exemplary Rebilling screen display 100 includes a check box 132 for the customer to indicate that reprice parameters are to be applied. This check box may be substituted with any type of input field or selectable graphic known to those skilled in the art. The referenced "reprice parameters" are those as chosen or selected by the customer in connection with the rebilling procedure of the present invention (discussed below). If the check box 132 is filled in or otherwise activated, then the billed charges are rebilled to the desired elements of the organization, in a manner specified by the customer. If check box 132 is not filled in or otherwise activated, then this lack of activation indicates that reprice parameters are not to be applied.

Further, the exemplary Rebilling screen display includes a rebilling analysis block 134. The function of this rebilling block 134, when activated, is to include on the invoice an analysis or display of billed versus rebilled charges. Rebilling analysis block 134 includes an input field 136 for specifying the level of the organizational hierarchy by which billed versus rebilled charges may be analyzed or displayed. As shown, input field 136 may comprise a pull-down menu. Filling in or otherwise activating check box 138 causes the billed vs. rebilled analysis or display to be carried out in the manner specified in input field 136. If check box 138 is not filled in or otherwise activated, this lack of activation indicates that no billed vs. rebilled analysis or display is to be performed.

Continuing to refer to the exemplary Rebilling screen display 100 of FIG. 1, command buttons may appear on the display such as the "set reprice parameters" command button 140 and "enter misc. charges" command button 142. Activating the set reprice parameters command button 140 invokes the function of setting reprice parameters of the present invention. In the exemplary embodiment, this function is implemented through three Price Adjustment Parameters screen displays, shown as FIGS. 2–4. It will be appreciated by one skilled in the art that several alternatives to command buttons may be employed to invoke the function. For example, a URL or other link may be used to call up the Price Adjustment Parameters screen displays. Alternately, this function may be implemented with a single screen display or in other ways as will occur to those skilled in the art.

Figure 2:
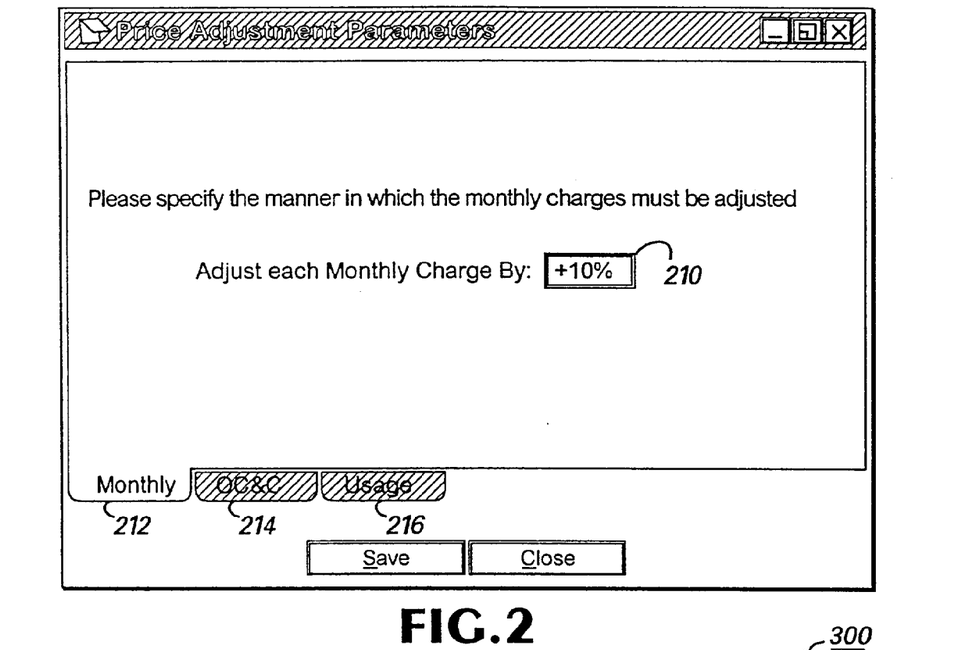
FIG. 2 is a diagram showing an exemplary price adjustment parameters screen display for adjusting monthly charges.

In the exemplary embodiment, price adjustments or "rebills" of billed charges may be made with regard to three types of charges: monthly charges; other charges & credits; and/or usage charges. FIG. 2 illustrates an exemplary Price Adjustment Parameters screen display 200 for use by the customer in adjusting a first type of charge, such as monthly charges. As illustrated in FIG. 2, an input field 210 is provided on the screen display 200 for a customer to select, enter or otherwise activate a particular reprice parameter that will be applied to monthly charges. The reprice parameter may be a percentage such as the illustrated "+10%" found in input field 210. Alternatively, the customer may select, enter or activate a particular dollar amount, etc. by which to adjust each monthly charge.

Figure 3:
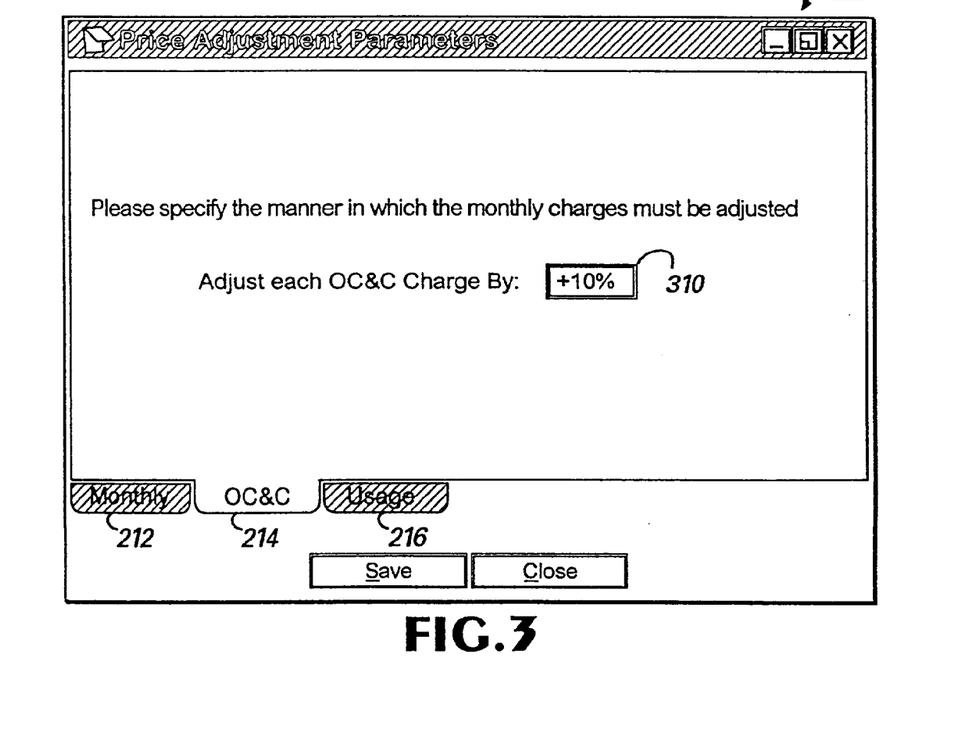
FIG. 3 is a diagram showing an exemplary price adjustment parameters screen display for adjusting other charges and credits.
Figure 4:
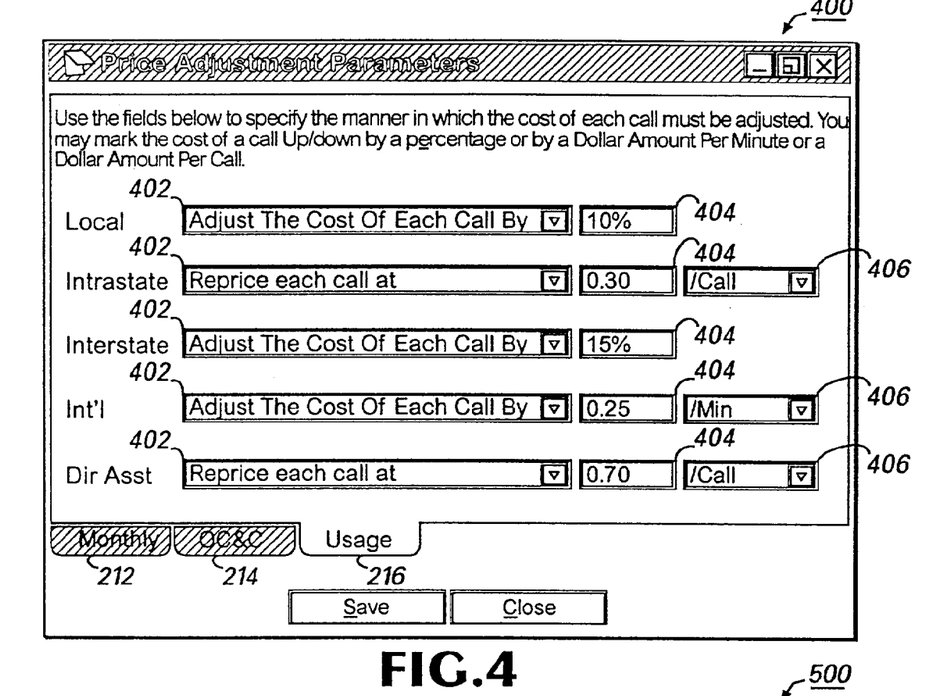
FIG. 4 is a diagram showing an exemplary price adjustment parameters screen display for adjusting usage charges.

The exemplary screen display 200 includes tabs 212, 214, and 216 which are respectively labeled "Monthly," "OC&C," and "Usage." The tabs serve as links to the three Price Adjustment Parameters screen displays in FIGS. 2–4. Tab 212 corresponds to display screen 200 (FIG. 2); tab 214 corresponds to screen display 300 (FIG. 3); and tab 216 corresponds to screen display 400 (FIG. 4). Tabs 212, 214, and 214 appear in all three screen displays 200 (FIG. 2), 300 (FIG. 3), and 400 (FIG. 4). Selecting or otherwise activating a tab 212, 214, or 216 will cause the current screen display to switch to the Price Adjustment Parameters screen display corresponding to the label on the tab. In FIG. 2, tab 212 is more clearly readable than tabs 214 and 216 in display screen 200, indicating that the current screen display 200 relates to price adjustment parameters for monthly charges.

While the exemplary embodiment of the present invention employs tabs 212, 214, and 216 to toggle between Price Adjustment Parameters screen displays, it will be appreciated by those skilled in the art that many other alternatives exist, such as command buttons, hyperlinks, URLs, and the like. Further, it will be appreciated that the plurality of Price Adjustment Parameters screen displays can be incorporated into a single screen display, or even incorporated into the original Rebilling screen display 100 of FIG. 1.

FIG. 3 illustrates an exemplary Price Adjustment Parameters screen display 300 for use by the customer in adjusting a second type of charge, such as other charges & credits. As illustrated in FIG. 3, an input field 310 is provided on the screen display 300 for a customer to select, enter or activate a particular reprice parameter that will be applied to other charges and credits. The reprice parameter may be a percentage such as the illustrated "+10%" found in input field 310. Alternatively, the customer may select, enter or activate a particular dollar amount, etc. by which to adjust each monthly charge. In FIG. 3, tab 214, is more clearly readable than tabs 212 and 216, indicating that the current screen display 300 relates to price adjustment parameters for other charges and credits (OC&C).

FIG. 4 illustrates an exemplary Price Adjustment Parameters screen display 400 for use by the customer in adjusting a third type of charge, such as usage charges. In FIG. 4, tab 216 is more clearly readable than tabs 212 and 214, indicating that the current screen display 400 relates to price adjustment parameters for usage charges. In the exemplary embodiment, usage charges relate to local, intrastate, interstate, international, or directory assistance services. As shown in FIG. 4, input fields 402, 404, and 406 are provided on the screen display 400 for a customer to select, enter or activate a particular call type for adjustment or rebilling.

Input field 402, provided as a pull-down table, allows the user to specify whether a call is going to be adjusted, i.e. inflated or deflated, or all together repriced at a different rate. Input field 404 enables the user to specify whether a call is to be adjusted or repriced by a percentage or a fixed dollar amount. As shown, input field 404 accepts reprice parameters as typed inputs from the user's keyboard. However, input field 404 may also comprise a pull-down table, or any other commonly know input means. Input field 406 allows the user to specify whether a call is to be adjusted or repriced on an per call basis or on a per minute basis.

It will be clear to those skilled in the art that specific reprice parameters discussed in conjunction with FIGS. 2–4 are merely illustrative and in no way limit the scope of the present invention. It is contemplated that the method and system of the present invention may be customized to meet the specific needs and demands of the customer organization. As such, any reprice parameters may be incorporated into the present invention. Further, it is contemplated that the present invention may be modified to account for charges and services other than those mentioned herein.

Figure 5:
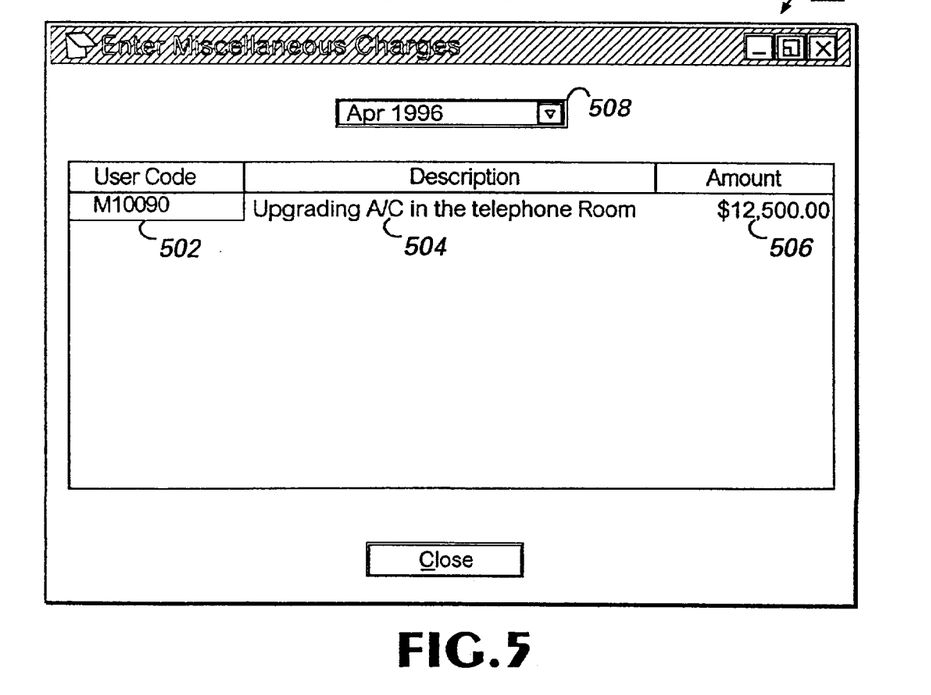
FIG. 5 is a diagram showing an exemplary enter miscellaneous charges screen display.

Referring again to the exemplary Rebilling screen display 100 of FIG. 1, activating the "enter misc. charges" command button 142 invokes the function of entering miscellaneous charges of the present invention. In the preferred embodiment, this function is implemented through an Enter Miscellaneous Charges screen display. FIG. 5 illustrates an exemplary Enter Miscellaneous Charges screen display 500 for use by the customer in entering miscellaneous charges to be incorporated into an invoice, internal bill or rebill to an element of the organization or a level of the organizational hierarchy. These miscellaneous charges may not necessarily be included in the billing information of an electronic bill. These miscellaneous charges may represent charges that the organization desires to allocate or to assign to a particular element or hierarchical level of the organization. As illustrated in FIG. 5, the exemplary Enter Miscellaneous Charges screen display 500 includes an input field 502 for User Code. The User Code is a code to indicate the element or hierarchical level of the organization to which the miscellaneous charge is to be assigned or allocated. Input field 504 allows the user to record a description of the miscellaneous charge and input field 506 allows the user to specify the amount of the miscellaneous charge. One additional input field 508 is provided in exemplary screen display 500 as a pull-down table for specifying the date of the invoice to which the miscellaneous charge is to be applied. Other input fields may be also included in screen display 500, depending on the particular needs of the organization.

GENERAL AND FLOW CHART DESCRIPTION OF THE EXEMPLARY SYSTEM AND METHODS OF THE PRESENT INVENTION

Generally described, with respect to charges incurred by an organization during a given period of time, the present invention may be characterized as a method and system to create an invoice for at least a portion of the charges for further distribution to an element of the organization. This method and system display an element list on a display screen. The element list preferably includes each element of the organization arranged in a hierarchical manner. Upon receipt of an input signal representing the selection of one of the elements from the element list as a selected element, the method and system compile an invoice for the selected element by selecting each charge associated with the selected element from the charges incurred by the organization during the given period of time, and including each charge associated with the selected element in the invoice.

The method and system may include charges from a particular vendor. In that case, the method and system may provide on the display a pull-down table to view a list of vendors whose vendor charges are included in the charges incurred by the organization during the given period of time. In response to receiving a vendor input signal representing the selection of the particular vendor from the list of vendors, the method and system may compile the invoice for the selected element by selecting each charge associated with the selected element and with the particular vendor, and including each charge associated with the selected element and with the particular vendor in the invoice.

In addition, the method and system may provide a place to indicate that the charges should be re-billed to the selected element of the organization. In response to receiving an indication that the charges should be re-billed, with respect to each charge associated with the selected element, the method and system may change each charge to a rebilled charge and may include each rebilled charge in the invoice instead of including each original charge associated with the selected element in the invoice.

Further, the method and system may compile the invoice for the selected element, with respect to each charge associated with the selected element, categorizing each charge as a first type of charge, as a second type of charge or as a third type of charge. On the display, a place may be provided to indicate the selection of a charge type input. In response to receiving the charge type input representing the selection of the first type of charge, the second type of charge or the third type of charge as the selected type of charge for rebilling, the method and system may change the selected type of charge to a rebilled charge. Further, the method and system may include each rebilled charge in the invoice instead of including each charge associated with the selected element in the invoice.

Figure 6:
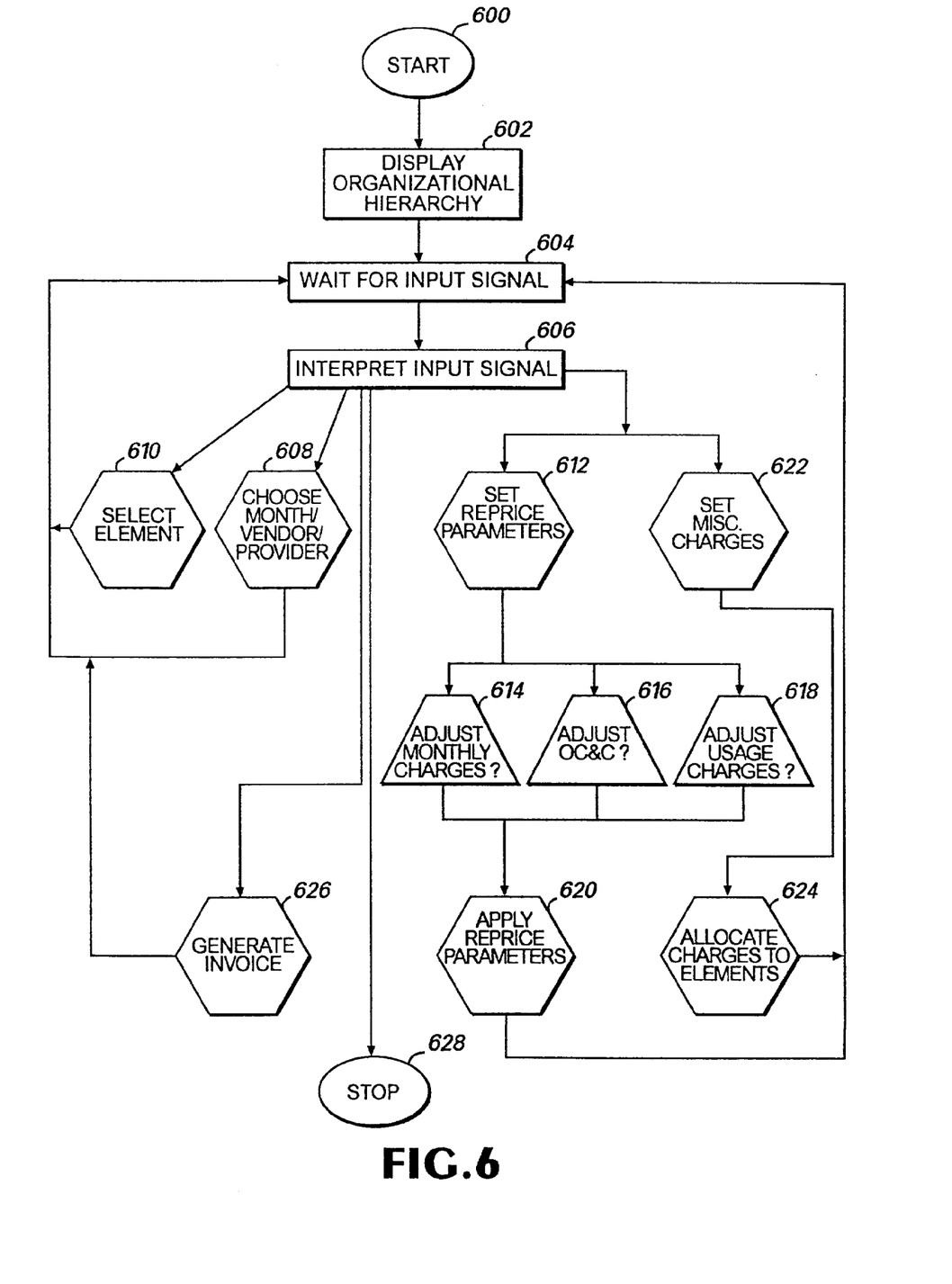
FIG. 6 is a flowchart detailing the operation of the present invention.

FIG. 6 illustrates an exemplary embodiment of this rebill method and system. The flow diagram is entered in start step 600 and proceeds to step 602 where the organizational hierarchy is displayed on the display device. Next, step 604 is encountered, whereby the system awaits an input signal from the user. The user input signal is interpreted in step 606 as being one of the following commands: select an element in the organizational hierarchy, choose an invoice date/vendor/provider, set reprice parameters, set miscellaneous charges, generate an invoice, quit the application.

If the command causes the system and method to proceed to step 608, the user may choose the month of the invoice which is to be rebilled, the billing vendor, and/or the provider of the services for which the user wishes to use the rebill procedure. Some, all, or none of these fields may be selected. Providing more information narrows the billing information accessed by the rebill procedure. After completing step 608, the system and method return to step 604 to await an input signal from the user.

Assuming the signal is interpreted as a select element command, the system and method proceed to step 610 wherein the user is given the opportunity to restrict the rebill function to a specific level of the organizational hierarchy. This may be accomplished through the use of the element list pertaining to the customer's organization. Selecting a specific organizational element instructs the system and method to search a database of all services provided to the organization and to extract only those services associated with the selected organizational element and its subelements. After completion of step 610, the system and method return to step 604 to await the next user input signal.

If the user input signal represents a set reprice parameters command, the system and method proceed to step 612. By setting reprice parameters, the user may inflate or discount to the billed charges. The user has three different repricing options available: adjusting monthly charges in step 614, adjusting other charges and credits as detailed in step 616, and adjusting usage parameters in step 618. The user may adjust all, none, or some of these parameters at the user's option.

If the user wishes to adjust monthly charges in step 614, then the user is presented with a separate display in which to make adjustments. The user is prompted to adjust each monthly charge by a percentage of the overall charge, which will then be reflected in the invoice for the element of the organization selected in step 610.

In step 616, the user may also adjust other charges and credits (OC&C) by a specific percentage amount. As with step 614, a separate display is shown for adjusting the OC&C. The OC&C may be adjusted on a monthly basis. Also like step 614, the OC&C charge may be adjusted by a percentage of the overall OC&C charge, which will then be added to the invoice for the element of the organization selected in step 610.

In step 618, the user is given the option to adjust the usage charges for the element of the organization selected in step 610. Invoking the option to adjust the usage reprice parameters calls up a separate display in which the various usage types and options for adjustment are shown. In the exemplary embodiment, the user may adjust separate categories of usage charges. Using the example of telecommunications billing, the user may be presented with five different types of usage charges: local, intrastate, interstate, international, and directory assistance calls. Each category may be repriced in three distinct ways: as a percentage of the total cost for that category, as an addition to the cost for an individual unit within that category, or as an addition to the total time spent within that category. Thus, continuing with the example of telecommunications billing, local calls might be adjusted by 10% of the total cost, intrastate calls might be repriced by adding 30 cents to the cost of each such call, international calls could by adjusted by increasing the costs for such calls by 25 cents per minute, and so on. In addition, the user may specify an absolute amount for individual units within each category or an absolute amount for time units within a category. Thus, in the above example, the user might reprice every telephone call to directory assistance to be a flat fee of 70 cents.

Following the completion of steps 614, 616, or 618, the system and method progress to step 620, where the reprice parameters are applied to the originally billed charges associated with the selected element of the organization. It should be noted, however, that in the exemplary embodiment, the user has the option of whether or not to apply the reprice parameters. If the "apply reprice parameters option" is not somehow activated, any reprice parameters set in steps 614–618 will be ignored. After the step 620 has been performed, the system reverts to step 604 to wait for another user input signal.

Assuming the next input signal is interpreted as representing a set miscellaneous charges command, the system and method move to step 622. A separate view or display screen will open in step 622 where the user enters the amount and description of the miscellaneous charge, along with a "user code". The user code corresponds to the level of the organizational hierarchy to which the user wishes to apply the miscellaneous charge. Continuing to use the examples described above, the user may choose to enter a miscellaneous charge of $12,500 for the cost of upgrading the air conditioning in the telephone room of the MidTown Branch. The user would then input the user code corresponding to the MidTown Branch. Next, in Step 624, the method and system allocate the charge to the hierarchy. In the above example, the cost of upgrading the air conditioning would be spread among all subelements of the MidTown Branch. After the miscellaneous charges are allocated in step 624, the method and system go back to step 604 to await the next input signal.

After all selections have been made by the user, the next input signal will typically be the generate invoice command. Upon receiving such a command, the system and method will proceed to step 626 and an invoice will be generated. The invoice will include all charges that are to be billed to the selected element of the organization as well as any price adjustments and miscellaneous charges specified by the user. Again, the system and method return to step 604 to await a further input signal. If the user wishes to generate another invoice for another element of the organization, the above described procedure is repeated. Otherwise, the next input signal will represent a quit command and the method and system will exit the flowchart at step 628.

As a general summary, the present invention provides a method and system for automatically adjusting charges billed to an organization by a service provider, so as to create a rebill charge. The method and system advantageously include a display of an organizational hierarchy on a display device, that allows the customer may narrow the scope of the rebilling procedure to a specific element of the organization or level of the organizational hierarchy. The method and system associate a selected element with services that has been provided to the selected element by the corresponding service provider. The billed charges for the services are then adjusted, so as to calculate the rebill charge.

To adjust the billed charges, the method and system advantageously allow the user to input a reprice parameter and/or a miscellaneous charge. The reprice parameter is used to adjust the billed charges by a desired percentage, by a fixed rate per time, or by a fixed charge per service. The miscellaneous charge is a charge that is in addition to the billed charges. After the billed charges are adjusted, an invoice is generated based on the rebill charge. Advantageously, the method and system of the present invention allow the billed charges to be automatically adjusted and rebilled to any element in the organizational hierarchy.

CONCLUSION

The present invention has been described in relation to particular embodiments which are intended in all respects to be illustrative rather than restrictive. Those skilled in the art will understand that the principles of the present invention may be applied to electronic billing systems used throughout the telecommunications industry. Those skilled in the art will also understand that the present invention may be employed by any type of organization that consists of elements and has a need to allocate and rebill charges to those elements.

Alternate embodiments will become apparent to those skilled in the art to which the present invention pertains, without departing from its spirit and scope. Therefore the scope of the present invention is to be limited only by the claims below and equivalents thereof.

What is claimed is:

1. In an electronic billing system for analyzing and managing billed charges which are billed to an organization by multiple service providers, a method of automatically adjusting the billed charges to create an invoice of rebill charges which are to be distributed among elements of the organization, the method comprising:

displaying an organizational hierarchy of the organization on a display device, the organizational hierarchy including at least one element of the organization;

associating a selected element with services that have been provided to the selected element by the multiple service providers;

categorizing into groups the billed charges corresponding to the services;

accepting respectively an independent reprice parameter for each of the groups of the billed charges;

applying respectively each of the independent reprice parameter to each of the groups of the billed charges in order to calculate rebill charges; and generating an invoice including the rebill charges, whereby the billed charges can be automatically adjusted and rebilled to any element in the organizational hierarchy.

2. The method of claim 1, wherein associating the selected element with services further comprises restricting the services to those of a particular service provider, whereby the billed charges of the particular service provider can be rebilled independently from the charges of any other service providers.

3. A computer-readable medium having stored thereon computer-executable instructions for performing the steps of claim 1.

4. In an electronic billing system for analyzing and managing billed charges which are billed to an organization by multiple service providers, a method of automatically adding miscellaneous charges to the billed charges to create an invoice of rebill charges which are to be distributed among elements of the organization, said method comprising:

displaying an organizational hierarchy of the organization on a display device, the organizational hierarchy including at least one element of the organization;

associating a selected element with services that have been provided by a particular service provider to the selected element;

accepting at least one miscellaneous charge;

including said at least one miscellaneous charge with the billed charges corresponding to the services, so as to calculate the rebill charges; and generating an invoice including the rebill charges, whereby the miscellaneous charges can be applied to the billed charges of the particular service provider and billed to any element of the organization independently of any other service providers.

5. A computer-readable medium having stored thereon computer-executable instructions for performing the steps of claim 4.

6. In a computer system including a display device and a user input device for generating an input signal, a display device having rendered thereon:

a field containing an organizational hierarchy of an organization, said hierarchy including at least one element of the organization;

a field containing a list of multiple service providers which have billed charges to the organization;

a field containing a list of the services that have been provided by the multiple service providers;

at least one field for categorizing into groups the billed charges corresponding to the services; and at least one reprice parameter input field for accepting respectively an independent reprice parameter for each of the groups.

7. The display device of claim 6 having further rendered thereon a selectable graphic to effect the respective application of the reprice parameters to each of the groups of the billed charges so as to calculate rebill charges.

8. The display device of claim 6 having further rendered thereon a selectable graphic to effect generation of an invoice based on the billed charges and the rebilled charges.

9. The display device of claim 6, having further rendered thereon at least one miscellaneous charges input field for accepting miscellaneous charges that may be included with the billed charges from the multiple service providers, in order to calculate the rebill charges.

10. The display device of claim 6 having further rendered thereon a selectable graphic to effect restriction of the services to those of a particular service provider, whereby the billed charges of the particular service provider can be rebilled independently from the charges of any other service providers.

11. In an electronic billing system for analyzing and managing billed charges which are billed to an organization by multiple service providers, a method of automatically adjusting the billed charges to create an invoice of rebill charges which are to be distributed among elements of the organization, the method comprising:

displaying an organizational hierarchy of an organization on a display device, the organizational hierarchy including at least one element of the organization;

associating a selected element of the organization with services that have been provided to the selected element by a particular service provider so that the billed charges of the particular service provider can be rebilled independently from the billed charges of any other service providers;

identifying a reprice parameter;

applying the reprice parameter to the billed charges of the particular service provider, so as to calculate rebill charges; and generating an invoice including the rebill charges, whereby the billed charges can be automatically adjusted and rebilled to any element in the organizational hierarchy.

12. A computer-readable medium having stored thereon computer-executable instructions for performing the steps of claim 4.

13. A computer-readable medium having stored thereon computer-executable instructions for performing the steps of claim 2.

* * * * *